(12) United States Patent
Prakash et al.

(10) Patent No.: US 9,922,205 B2
(45) Date of Patent: Mar. 20, 2018

(54) MANAGING PERSONAL PRIVACY SETTINGS

(71) Applicant: Intel Corporation, Santa Clara, CA (US)

(72) Inventors: Gyan Prakash, Beaverton, OR (US); Rajesh Poornachandran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/810,083

(22) Filed: Jul. 27, 2015

(65) Prior Publication Data

US 2015/0332066 A1 Nov. 19, 2015

Related U.S. Application Data

(63) Continuation of application No. 13/629,389, filed on Sep. 27, 2012, now Pat. No. 9,092,642.

(51) Int. Cl.
| | |
|---|---|
| *G06F 21/00* | (2013.01) |
| *G06F 21/62* | (2013.01) |
| *G06F 9/445* | (2018.01) |
| *G06F 17/30* | (2006.01) |

(52) U.S. Cl.
CPC ............ *G06F 21/6245* (2013.01); *G06F 8/61* (2013.01); *G06F 17/30876* (2013.01); *G06F 21/6272* (2013.01)

(58) Field of Classification Search
CPC .......................... G06F 21/6245; G06F 21/6272
See application file for complete search history.

(56) References Cited

U.S. PATENT DOCUMENTS

| | | | |
|---|---|---|---|
| 9,092,642 B2 | 7/2015 | Prakash et al. | |
| 2009/0031301 A1 | 1/2009 | D'angelo et al. | |
| 2009/0070412 A1 | 3/2009 | D'angelo et al. | |
| 2009/0171964 A1* | 7/2009 | Eberstadt | G06F 17/30873 |
| 2011/0004693 A1* | 1/2011 | Rehfuss | G06Q 30/02 |
| | | | 709/229 |
| 2011/0246574 A1* | 10/2011 | Lento | G06Q 10/10 |
| | | | 709/204 |
| 2012/0226569 A1 | 9/2012 | Bilotta | |
| 2014/0090091 A1 | 3/2014 | Prakash et al. | |

OTHER PUBLICATIONS

"U.S. Appl. No. 13/629,389, Final Office Action dated Jan. 8, 2015", 14 pgs.

(Continued)

*Primary Examiner* — Edward Zee
(74) *Attorney, Agent, or Firm* — Schwegman Lundberg & Woessner, P.A.

(57) ABSTRACT

Various systems and methods for managing user information on mobile devices are described herein. A selection of user information is received from a user operating a user device. A privacy setting for the selection of user information is received from the user, the privacy setting to permit or deny access to the user information to a third-party application. The selection of user information and the privacy setting is transmitted from the user device to a receiving device, where the receiving device is configured to enforce the privacy setting for the third-party application executing on the receiving device.

20 Claims, 4 Drawing Sheets (56) References Cited

OTHER PUBLICATIONS

"U.S. Appl. No. 13/629,389, Non Final Office Action dated May 16, 2014", 19 pgs.
"U.S. Appl. No. 13/629,389, Notice of Allowance dated Mar. 20, 2015", 5 pgs.
"U.S. Appl. No. 13/629,389, Response filed Mar. 5, 2015 to Final Office Action dated Jan. 8, 2015", 9 pgs.
"U.S. Appl. No. 13/629,389, Response filed Sep. 16, 2014 to Non-Final Office Action dated May 16, 2014", 15 pgs.

* cited by examiner

MANAGING PERSONAL PRIVACY SETTINGS

PRIORITY APPLICATION

This application is a continuation of U.S. application Ser. No. 13/629,389, filed Sep. 27, 2012, which is incorporated herein by reference in its entirety.

TECHNICAL FIELD

Embodiments pertain to the use of mobile electronic devices to store and manage profile information.

BACKGROUND

As an increasing number of people use online services to share content and connect to other people, people are consequently exposing an increasing amount of personal information. Thus, there is a need for a system that provides data privacy for personal information.

DETAILED DESCRIPTION

The present disclosure provides techniques and configurations used for managing personal data among personal contacts. The management system disclosed herein provides security enhancements to ensure data privacy. A person may desire to share personal, social, professional, or other information with another person (e.g., contact). Sharing of such information is commonly performed electronically. For example, the person may provide an electronic business card, profile, or other contact information to the recipient. However, once a person shares such information, the information is largely unsecured on the recipient's electronic device. Applications, programs, or processes on the recipient's device may access the shared information and alter it, disseminate it, or otherwise use it in a way that the sharing person may not like. An option of not sharing information, while available, is not desirable because it inhibits social networking, business arrangements, and other aspects. Thus, there is a need to provide a system that allows a user to share information in a secure manner.

Using the embodiments described herein, a user may indicate information to share with another person (e.g., another user). A user may access such information on a mobile device or at an installed, relatively stationary device. Mobile devices may include devices such as mobile phones, smartphones, tablet computers, laptop computers, personal digital assistants, and the like. Installed devices may include devices such as kiosks and information centers. Some devices, such as a vehicle navigation system may be considered an installed mobile device. Any such device used to transmit, receive, store, or otherwise manipulate user information is considered a user device for the purposes of this disclosure.

As used herein, user information includes information that describes a user's characteristics (e.g., age, gender, height, etc.), personal information (e.g., birth place, siblings, parents, home address, etc.), profession (e.g., job, title, location, email address, phone number, work history, etc.), activities (e.g., recreational sports, leisure activities, etc.), or interests (e.g., religion, travel, food, charity, shopping, literature, etc.). It is understood that this list of categories of user information is not meant to be exhaustive and that other forms of user information are encompassed in this disclosure. Furthermore, the organization of user information may be altered based on preference, design, or other considerations.

User information may be organized into an information profile. As used herein, an information profile is a collection of user information, organized by a common attribute of the user information. Examples of information profiles include, but are not limited to, a personal profile, a professional profile, and a social profile. The personal profile may include information that is generally private, or closely-held, information. A user may be highly selective of whom with to share information contained within a personal profile. The professional profile may include information related to the user's profession, such as a work email and phone number. The social profile may include information related to the user's social life, such as interests and hobbies.

Information profiles may be based on individual data or on other profiles, or on a combination of individual data and another profile. For example, a profile for close friends may include some or all of the information from a personal profile and a social profile. In addition, the profile for close friends may include some information not found in the combination of the personal and social profiles.

For each datum of information in an information profile, a user may designate a privacy setting. The privacy setting is used to permit or deny access to the datum of user information at another device (e.g., the receiving device). The privacy setting may be used at the receiving device to control access of third-party applications. Thus while a receiving application at the receiving device, such as a contact list or address book application, may access the datum of user information, third-party applications or other foreign applications are either permitted or denied access based on the privacy setting. In the following disclosure, the privacy setting has one of two states: "public" or "private," where a public setting allows third-party applications to access the shared user data, and where a private setting denies access to third-party applications to the data. It is understood that additional or alternative privacy settings may be used in order to achieve alternative embodiments.

In an embodiment, the privacy setting is per datum and is used for the respective datum wherever the datum is represented. For example, the user's home phone number may be marked as private. In this case, the home phone number is not shared with third-party applications regardless of what information profile is used to share the datum (home phone number) or whom the datum is initially shared with.

Figure 1:
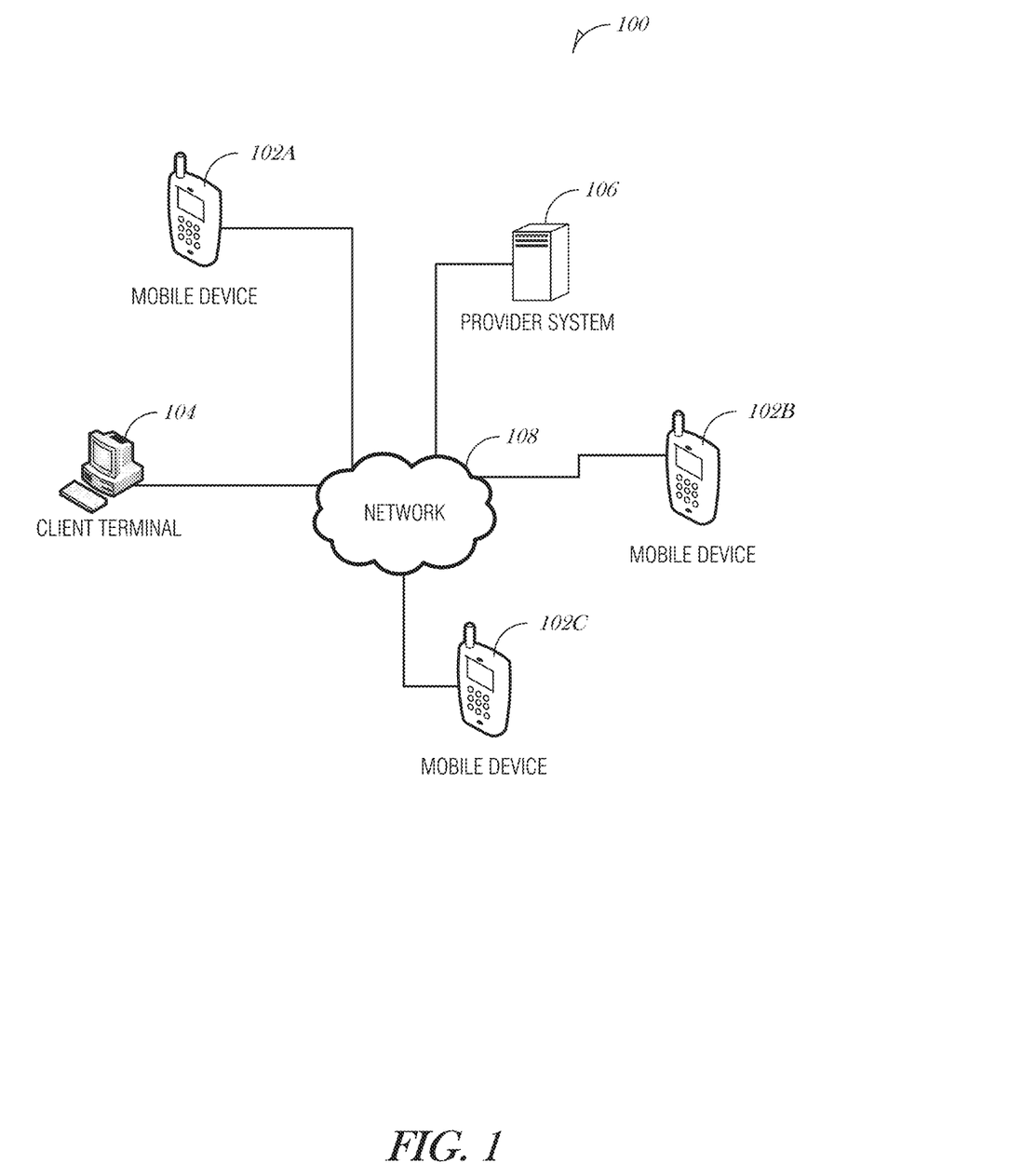
FIG. 1 is a schematic diagram illustrating a system for sharing and managing personal information, according to an example embodiment.

Turning to the figures, FIG. 1 is a schematic diagram illustrating a system 100 for sharing and managing personal information, according to an example embodiment. FIG. 1 includes mobile devices 102A, 102B, and 102C, a client terminal 104, a provider system 106, interconnected via a network 108.

The mobile device 102 includes devices such as a smartphone, cellular telephone, mobile phone, laptop computer, tablet computer, or other portable networked device. In general, the mobile device 102 is small and light enough to be considered portable and includes a mechanism to connect to a network, either over a persistent or intermittent connection.

The client terminal 104 may be equipped similar to the mobile device 102 in that it includes network capabilities and a user interface to receive information from a user and provide information to a user. Examples of client terminals include, but are not limited to, information kiosks, automotive navigation systems, desktop computers, and thin clients. It is understood that either the mobile device 102 or the client terminal 104 may be considered a user device for the purposes of this discussion.

The provider system 106 may be configured to receive user information from one mobile device 102 (e.g., mobile device 102A), store the user information, and then transmit the user information to another mobile device 102 (e.g., mobile device 102B). User information may be managed at a client terminal 104 and either transmitted or received at such a terminal by way of the provider system 106.

The provider system 106 may communicate with internal databases or file servers to publish or serve files via a web server. The provider system 106 may include a web server. The web server may consist of scripts, applications, or library files that provide primary or auxiliary functionality to the web server (e.g., multimedia, file transfer, or dynamic interface functions). The web server, either alone or in conjunction with one or more other computers in the provider system 106, may provide a user-interface. The user-interface may be implemented using a variety of programming languages or programming methods, such as HTML (HyperText Markup Language), VBScript (Visual Basic®) Scripting Edition), JavaScript™ XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

The provider system 106 may represent a group of two or more servers, cooperating with each other, provided by way of a pooled, distributed, or redundant computing model. Further, the provider system 106 may be implemented as a distributed system; for example, one or more elements of the provider system 106 may be located across a wide-area network from other elements of the provider system 106.

Continuing with discussion of FIG. 1, the network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single local area network (LAN) or wide-area network (WAN), or combinations of LANs or WANs, such as the Internet. The various devices coupled to the network 108 may be coupled to the network 108 via one or more wired or wireless connections.

Using the mobile device 102 or client terminal 104, a user may manage user information. In an embodiment, a user may organize user information into one or more information profiles, with each datum of information having an associated privacy setting. The information profile or profiles may be named for convenience. After creating such profiles, the user may then associate one or more contacts with a profile. A contact is understood to encompass a person or persons that the user is acquainted with. A contact may include, but is not limited to, a family member, a business acquaintance, a corporation or business, a colleague, a girlfriend or boyfriend, or a social acquaintance. Once associated, the contact is sent the user information in the information profile with the corresponding privacy settings for the data in the profile. Information profiles are used to organize information for the sharing user, but may not be represented to the receiving user. Instead, the receiving user may simply receive certain information that was shared, but may not have visibility into the information profile under which it was shared. The information profile structure is largely irrelevant to the receiving user.

In an embodiment, the profile information is sent by way of the provider system 106. In an embodiment, the provider system 106 receives the profile information from the user at a user device (e.g., mobile device 102A) and then transmits a push notification to the intended recipient device (e.g., mobile device 102B). The push notification is used to indicate that new or updated information is available for download to the recipient device (e.g., mobile device 102B). After a push notification is received at the recipient device, a user at the recipient device may be notified of the new or updated user information available, after which, the user at the recipient device may then transmit a request to download the user information and corresponding privacy setting to the recipient device.

Once downloaded to the recipient device, the profile information is stored. In an embodiment, the profile information is stored in a contact directory, such as an address book software application residing on the recipient device. Additionally, the privacy settings are stored on the recipient device. The privacy settings may be stored in the contact directory or in an auxiliary storage location. An application that is later executed on the recipient device and requests access to the user information stored thereon, will only be allowed access to information flagged "public." Thus, information marked as private will not be shared with applications on the recipient device.

Consider an example where a user named "Fred" is willing to share information with another user named "Jane." Fred knows Jane from work and is willing to share professional contact information with her. Thus Fred may associate Jane with a "professional information profile" that includes some of his personal contact information (e.g., name) and professional contact information (e.g., work phone, work email, and work title). Fred may further have marked his name and work title as "public" and his work phone and work email as "private." When Jane receives Fred's contact information, Jane is able to view all of the shared information in her contact database software. Later when Jane installs a third-party application on her mobile device, the application may prompt Jane for consent to access her stored contact list. If Jane accepts and consents to the action, Fred's contact information marked private is still concealed from the third-party application.

When a user updates user information, the updated information is transmitted to the provider system 106 and a push message is then transmitted to each user device that has the outdated user information stored thereon. The update may be an update to the data (e.g., a change in phone numbers) or an update to a privacy setting (e.g., toggling a setting from public to private). As in the situation when new information is disseminated, a user at the recipient device may receive the push notification, respond with a request to obtain the new or updated information, and then receive the new or updated information and corresponding privacy settings at the recipient device.

Returning to the Fred and Jane example from above, when Fred updates his work email address, a notice is sent to Jane indicating the update to the data. Similarly, if Fred were to toggle the privacy setting on the work phone number from "private" to "public," Jane would receive a notice. The notice may be a push notification.

Profile management may be performed in a semi-automated fashion. In an embodiment, profiles are dynamically defined based on a relationship level between two people. For example, a relationship level may be enumerated from 1 to 10, with 1 being the closest relationships (e.g., immediate family) and 10 being the remotest relationships (e.g., friends of friends). Based on the relationship level, a profile of user information may be generated. The profile may include personal, professional, health, fitness, hobby, or other information about the user, depending on the closeness of the relationship. For example, where a user is a husband, the wife may have nearly all user information about the husband shared to her device. Each piece of user information includes its own privacy setting, thus controlling its exposure to other applications running on her device. As another example, a person with a distant relationship to a third cousin may, using a dynamic profile, only make available a user's name and home phone number. In general, dynamic profiles allow for more or less exposure of a user's information based on the strength of the relationship with the person with whom the information is being shared. Such dynamic profiles may be stored on the user's device and control which information is synched with other devices.

Figure 2:
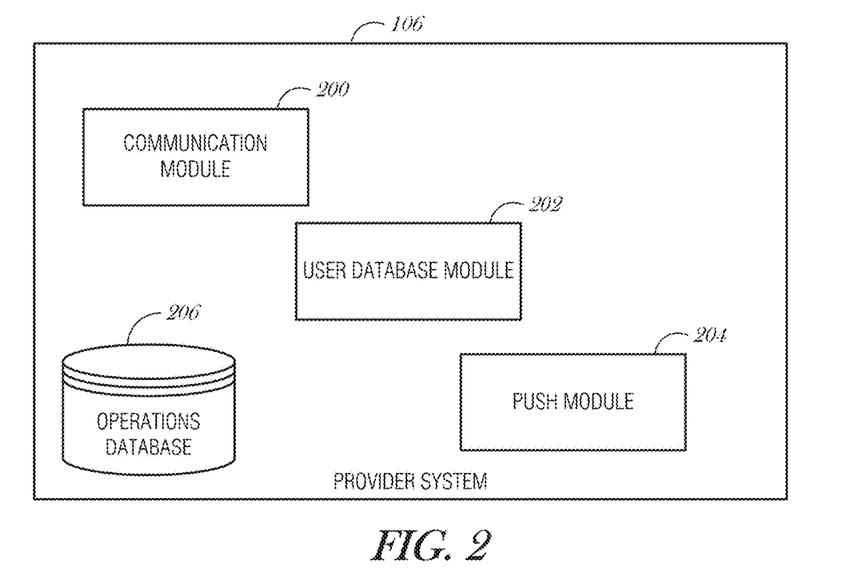
FIG. 2 is a block diagram illustrating the provider system, according to an example embodiment.

FIG. 2 is a block diagram illustrating the provider system 106, according to an example embodiment. The provider system 106 includes a communication module 200, a user database module 202, and a push module 204. The provider system 106 also includes an operations database 206, which may be used to store user information, system status information, and other operational information used to implement the processes and mechanisms disclosed herein.

The communication module 200 is used to receive, from a publisher user, user information and a corresponding privacy setting for the user information. The user information and privacy setting may be transmitted between the publisher user and the communication module using an encryption mechanism Examples of encryption mechanisms include, but are not limited to, public-key infrastructure (PKI) mechanisms (e.g., asymmetric cryptography), private key mechanisms (e.g., symmetric cryptography), and hashing mechanisms (e.g., Message Digest 5 (MD5) and Secure Hashing Algorithm (SHA)). Other specific mechanisms include Hypertext Transfer Protocol Secure (HTTPS) and Pretty Good Privacy (PGP). It is understood that other mechanism to encrypt or secure communications may be used.

The user database module 202 is used to determine a subscriber user, the subscriber user being a recipient of the user information and the corresponding privacy setting. In an embodiment, the user database module 202 accesses a user database to determine one or more users that are subscribers to the publisher user's information. The user database may be incorporated into the operations database 206. In order to determine the subscriber or subscribers, the user database module 202 may access a database table that contains relationships between the publisher user and one or more subscriber users. The user data module 202 may then provide a list of one or more subscriber users to the push module 204, in order to notify the subscriber users of the new or updated information from the publisher user.

The push module 204 notifies the subscriber user of the user information. A push notification mechanism is in contrast to pull mechanisms. A push notification mechanism operates as a publish/subscribe model. One or more users may subscribe to an information channel (e.g., the publisher's user information feed) and whenever new or updated content is available on the information channel, the server (e.g., the provider system 106) will push either the information itself or a notification of the information out to the subscribers. Thus, in an embodiment, the push module 204 notifies the subscriber user of the new or updated user information and waits until a request is received from a subscriber user before sending the user information and the corresponding privacy setting. In another embodiment, the push module 204 pushes the new or updated user information and the privacy setting to the subscriber device. The data push may be performed in the background in a manner that the subscriber user is unaware of the update. Optionally, the data push may be performed in a manner that apprises the subscriber user of the operation, such as by way of a notification window, an informational dialog box, a banner notification, or some other user interface mechanism (e.g., alert sounds, vibration, or the like).

Figure 3:
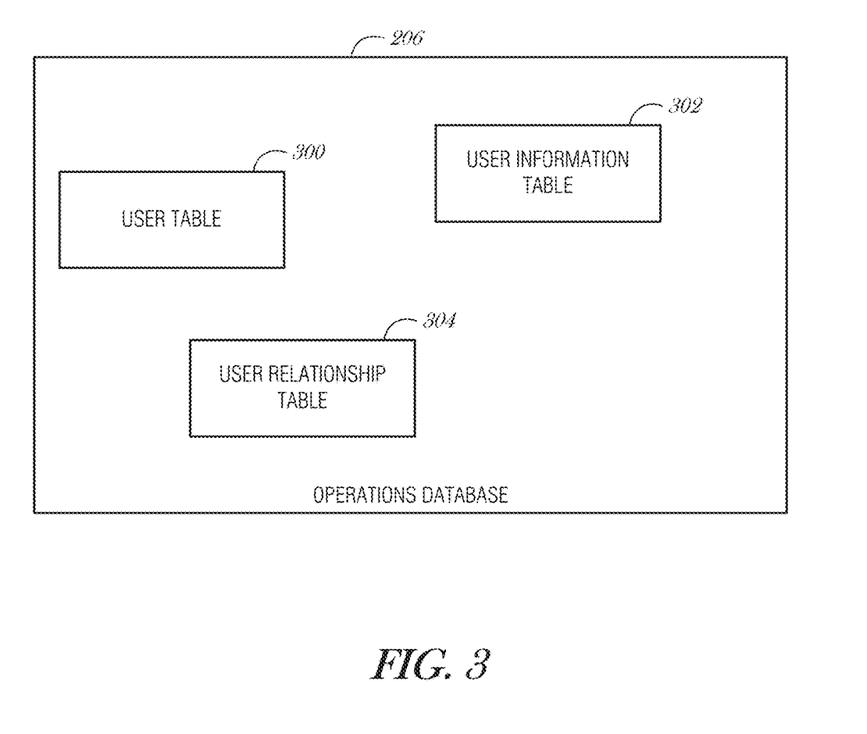
FIG. 3 is a block diagram illustrating an operations database, according to an example embodiment.

FIG. 3 is a block diagram illustrating an operations database 206, according to an example embodiment. The operations database includes a user table 300, a user information table 302, and a user relationship table 304. The user table 300 includes data describing users of the provider system 106, such as a user identification number, which may be used as a primary key on the user table 300, a user name, and other information to describe and define a user of the system. The user relationship table 304 includes information relating one or more users to one another. The user relationship table 304 may be organized to reflect a publisher-subscriber relationship between two users. A user may be both a publisher and subscriber. Thus, in an embodiment, the user relationship table 304 includes a publisher_user_id column and a subscriber_user_id column. The publisher_user_id column includes the user identification number of the user sharing information with one or more other users, each of which are identified in a separate row with a user identification in the subscriber_user_id column.

The user information table 302 includes a user's specific user information, such as a home phone number, a home mailing address, a person email address, a work phone number, a work email address, a date of birth, food interests, sports interests, reading interests, and the like. User information may be organized into one or more profiles, as described above. The user information table 302 may include a privacy setting flag on each record in the user information table 302, indicating whether the information in the record is publically accessible by a third-party application on a subscriber's device.

It is understood that the operations database 206 illustrated in FIG. 3 is merely one example and that optimizations may be used (e.g., a higher degree of normalization), which may result in more or fewer tables or information in tables, in various embodiments. Additionally, the operations database 206 may be distributed across two or more servers.

Figure 4:
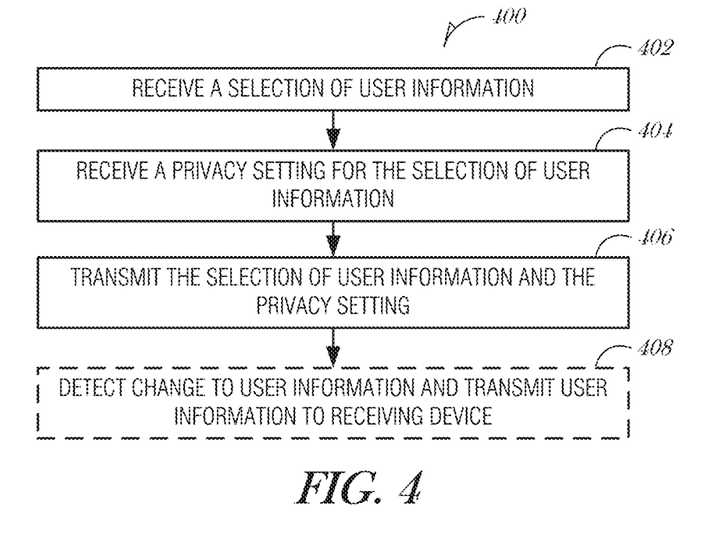
FIG. 4 is a flowchart illustrating a method for managing user information on mobile devices, according to an example embodiment.

FIG. 4 is a flowchart illustrating a method 400 for managing user information on mobile devices, according to an example embodiment. At block 402, a selection of user information is received at a user device from a user operating the user device. In an embodiment, the user information includes one of: a name, an address, or a phone number. In an embodiment, the user information stored at the data store is organized into an information profile, the information profile reflecting an aspect of the user. The information profile may be configured to include user aspects such as personal information, professional information, social information, or fitness information about the user.

In an embodiment, the aspect of the user includes a personal life and the information profile includes personal information about the user. Personal information includes a home phone number, a cellular phone number, a home address, a date of birth, a social security number, a driver's license number, a health insurance provider, a health insurance identification number, a spouse name, a spouse phone number, emergency contact information, marital status, and the like.

In another embodiment, the aspect of the user includes a professional life and the information profile includes professional information about the user. Professional information includes a work phone number, a work email address, a title, a mailing address, and the like.

In another embodiment, the aspect of the user includes a private life and the information profile includes social information about the user. Social information may include information such as food interests, travel interests, sports interests, reading lists, charity interests, shopping interests, current shopping needs (e.g., wish lists, birthday lists, holiday gift lists), and the like.

In another embodiment, the aspect of the user includes health characteristics and the information profile includes fitness information about the user. Fitness information may include favorite exercises, resting heart rate, blood pressure, height, weight, cholesterol, or the like.

At block 404, a privacy setting for the selection of user information is received from the user. The privacy setting is implemented to permit or deny access to the user information to a third-party application.

At block 406, the selection of user information and the privacy setting is transmitted from the user device to a receiving device. The receiving device is then configured to enforce the privacy setting for the third-party application executing on the receiving device. In an embodiment, the receiving device is another user device. In another embodiment, the receiving device is an intermediary device, such as the provider system 106, as described above. In such an embodiment, the receiving device is an intermediary device configured to store and forward the user information and related privacy setting.

In a further embodiment, the method 400 includes detecting a change to the user information and in response to detecting the change to the user information, transmitting the user information to the receiving device (block 408). In an embodiment, detecting a change is implemented by periodically polling a data store at the user device to detect the change to the user information stored at the data store. Change detection may be implemented, for example, by using a "dirty bit" in a database record.

Figure 5:
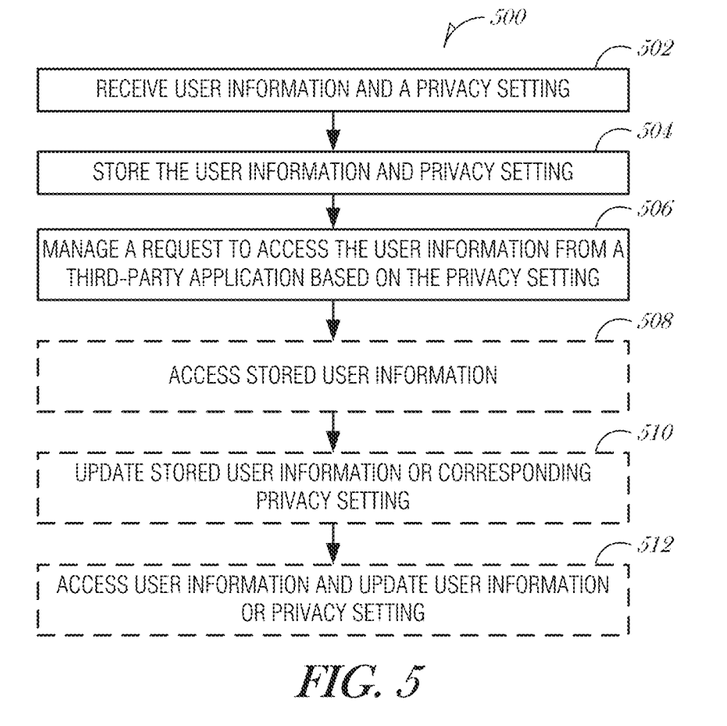
FIG. 5 is a flowchart illustrating a method for managing user information, according to an example embodiment.

FIG. 5 is a flowchart illustrating a method 500 for managing user information, according to an example embodiment. At block 502, user information and a privacy setting for the user information is received at a user device from a source device. The privacy setting is used to permit or deny access to the user information to a third-party application executing on the user device. In an embodiment, the source device includes an intermediary device that stores and forwards the user information and the privacy setting.

As discussed above, obtaining user information and privacy settings at the receiving device may be performed by one of two mechanisms: push and pull. Thus, in an embodiment using a pull mechanism, receiving the user information is performed by recurrently connecting to the source device to determine whether user information is available to download, and then downloading the user information and the privacy setting. In a further embodiment, the method 500 includes accessing stored user information, with the stored user information being previously downloaded and stored at the user device (block 508). The method 500 includes updating, based on the user information and privacy setting downloaded from the source device, at least one of the stored user information or corresponding privacy setting (block 510).

In an embodiment using a push notification, the method operation of receiving the user information is performed by receiving a push notification from the source device and in response to receiving the push notification, connecting with the source device, and retrieving the user information and the privacy setting. In a further embodiment, the method 500 includes accessing stored user information, with the stored user information being previously received and stored at the user device, and updating, based on the user information and privacy setting received from the source device, at least one of the stored user information or corresponding privacy setting (block 512).

In another push-based embodiment, the user information and privacy setting are pushed by the source device to the user device. The data push may be performed in the background to avoid interrupting the user's activity. The data push may be performed at routine times, such as once a day, or on demand, such as when the user information is updated at the source device.

At block 504, the user information and privacy setting is stored at the user device. The user information and privacy setting may be stored in an address book or contact database on the user device.

At block 506, a request to access the user information from a third-party application is managed based on the privacy setting.

In a further embodiment, the third-party application is executed on the user device. The privacy setting is checked for the user information and the third-party application is allowed or denied access to the user information based on the privacy setting.

In a further embodiment, during an attempt to install the third-party application is on the user device, the privacy setting for the user information is checked, and or denying the third-party application is allowed to install based on the privacy setting.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 6:
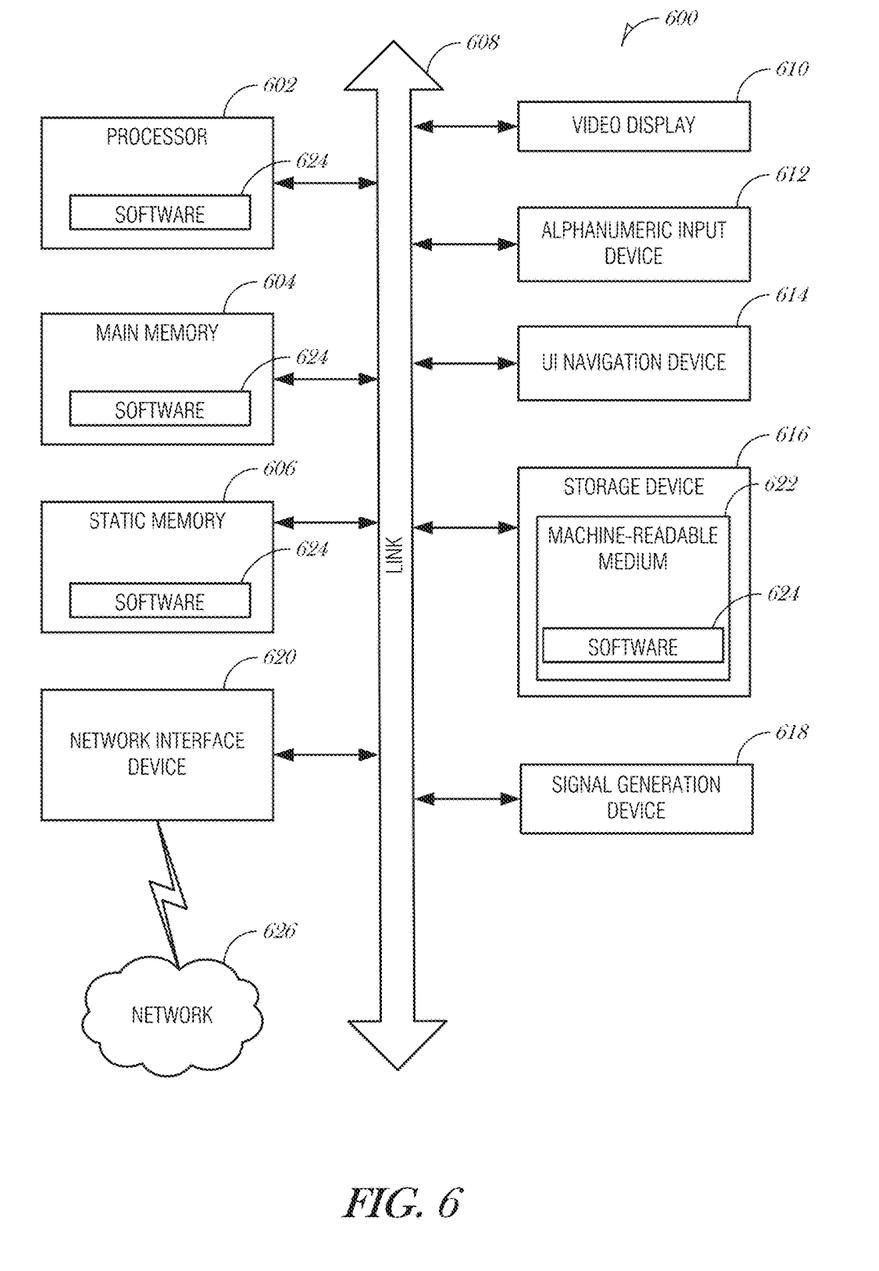
FIG. 6 is a block diagram illustrating a machine in the example form of a computer system, within which a set or sequence of instructions for causing the machine to perform any one of the methodologies discussed herein may be executed, according to an example embodiment.

FIG. 6 is a block diagram illustrating a machine in the example form of a computer system 600, within which a set or sequence of instructions for causing the machine to perform any one of the methodologies discussed herein may be executed, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor can be configured as respective different modules at different times. Accordingly, software can configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

ADDITIONAL NOTES & EXAMPLES

Example 1 may include subject matter (such as a method, means for performing acts, machine readable medium including instructions that, when performed by a machine cause the machine to performs acts, or an apparatus configured to perform) comprising receiving at a user device from a user operating the user device, a selection of user information, receiving from the user, a privacy setting for the selection of user information, the privacy setting to permit or deny access to the user information to a third-party application, and transmitting from the user device to a receiving device, the selection of user information and the privacy setting, wherein the receiving device is configured to enforce the privacy setting for the third-party application executing on the receiving device.

Example 2 can include, or can optionally be combined with the subject matter of Example 1 where optionally the receiving device is another user device.

Example 3 can include, or can optionally be combined with the subject matter of one or any combination of Examples 1 through 2 to optionally include transmitting the selection of user information and the privacy setting to the receiving device by transmitting the selection of user information and the privacy setting to an intermediary device configured to store and forward the user information and related privacy setting to the receiving device.

Example 4 can include, or can optionally be combined with the subject matter of one or any combination of Examples 1 through 3 where the user information optionally includes one of: a name, an address, or a phone number.

Example 5 can include, or can optionally be combined with the subject matter of one or any combination of Examples 1 through 4 to optionally include detecting a change to the user information and in response to detecting the change to the user information, transmitting the user information to the receiving device.

Example 6 can include, or can optionally be combined with the subject matter of one or any combination of Examples 1 through 5 to optionally include detecting a change to the user information by periodically polling a data store at the user device to detect the change to the user information stored at the data store.

Example 7 can include, or can optionally be combined with the subject matter of one or any combination of Examples 1 through 6 to optionally include the user information stored at the data store organized into an information profile, the information profile reflecting an aspect of the user.

Example 8 can include, or can optionally be combined with the subject matter of one or any combination of Examples 1 through 7 to optionally include the aspect of the user including professional life and wherein the information profile includes professional information about the user.

Example 9 can include, or can optionally be combined with the subject matter of one or any combination of Examples 1 through 8 to optionally include the aspect of the user includes a private life and the information profile includes social information about the user.

Example 10 can include, or can optionally be combined with the subject matter of one or any combination of Examples 1 through 9 to optionally include the aspect of the user includes health characteristics and the information profile includes fitness information about the user.

Example 11 may include subject matter (such as a method, means for performing acts, machine readable medium including instructions that, when performed by a machine cause the machine to performs acts, or an apparatus configured to perform) comprising receiving at a user device from a source device, user information and a privacy setting for the user information, the privacy setting used to permit or deny access to the user information to a third-party application executing on the user device, storing the user information and privacy setting at the user device, and managing a request to access the user information from the third-party application based on the privacy setting.

Example 12 can include, or can optionally be combined with the subject matter of Example 11 where optionally the source device comprises an intermediary device that stores and forwards the user information and the privacy setting.

Example 13 can include, or can optionally be combined with the subject matter of one or any combination of Examples 11 through 12 to optionally include receiving user information and the privacy setting by recurrently connecting to the source device to determine whether user information is available to download, and downloading the user information and the privacy setting.

Example 14 can include, or can optionally be combined with the subject matter of one or any combination of Examples 11 through 13 to optionally include accessing stored user information, the stored user information being previously downloaded and stored at the user device, and updating at least one of the stored user information or corresponding privacy setting, based on the user information and privacy setting downloaded from the source device.

Example 15 can include, or can optionally be combined with the subject matter of one or any combination of Examples 11 through 14 to optionally include receiving user information and the privacy setting by receiving a push notification from the source device and in response to receiving the push notification, connecting with the source device and retrieving the user information and the privacy setting.

Example 16 can include, or can optionally be combined with the subject matter of one or any combination of Examples 11 through 15 to optionally include accessing stored user information, the stored user information being previously received and stored at the user device, and updating at least one of the stored user information or corresponding privacy setting, based on the user information and privacy setting received from the source device.

Example 17 can include, or can optionally be combined with the subject matter of one or any combination of Examples 11 through 16 to optionally include executing the third-party application on the user device, checking the privacy setting for the user information, and allowing or denying access to the user information for the third-party application based on the privacy setting.

Example 18 can include, or can optionally be combined with the subject matter of one or any combination of Examples 11 through 17 to optionally include attempting to install the third-party application on the user device, checking the privacy setting for the user information, and allowing or denying the third-party application to install based on the privacy setting.

Example 19 may include subject matter (such as a device, apparatus, or computing device) comprising a communication module to receive, from a publisher user, user information and a corresponding privacy setting for the user information, the privacy setting indicating whether a third-party application on a device operated by a subscriber user is to have access to the user information, a user database module to determine a subscriber user, the subscriber user being a recipient of the user information and the corresponding privacy setting, and a push module to notify the subscriber user of the user information.

Example 20 can include, or can optionally be combined with the subject matter of Example 19 where the user information optionally comprises at least one of: a name, an address, or a phone number.

Example 21 can include, or can optionally be combined with the subject matter of one or any combination of Examples 19 through 20 to optionally include the user database module configured to access a user database, the user database including: at least one database table to define a relationship between the publisher user and the subscriber user, and at least one database table to define a privacy setting for a datum of user information of the publisher user.

Example 22 can include, or can optionally be combined with the subject matter of one or any combination of Examples 19 through 21 to optionally include the communication module configured to receive a request for the user information from a device of the subscriber user, the request in response to the push notification and transmit the user information and the corresponding privacy setting to the device of the subscriber user.

Example 23 can include, or can optionally be combined with the subject matter of one or any combination of Examples 19 through 22 to optionally include the communication module configured to receive a request for the user information from a device of the subscriber user, the request in response to the push notification and synchronize user information and corresponding privacy settings between the device of the subscriber user and the system.

Example 24 may include subject matter (such as a device, apparatus, or computing device) comprising a provider computer system and a transmitting user device and a receiving user device connected to the provider computer system, where the transmitting user device is configured to receive from a user operating the transmitting user device, user information and a privacy setting for the user information, the privacy setting to permit or deny access to the user information to a third-party application and transmit the user information and the privacy setting to the provider computer system, and where the provider system is configured to receive the user information and the privacy setting from the transmitting user device and transmit the user information and the privacy setting to the receiving user device, and where the receiving user device is configured to receive the user information and the privacy setting for the user information, store the user information and privacy setting at the receiving user device, and manage a request to access the user information based on the privacy setting, the request from a third-party application installed on the receiving user device.

Example 25 can include, or can optionally be combined with the subject matter of Example 24 where the transmitting user device comprises a smartphone.

Example 26 can include, or can optionally be combined with the subject matter of one or any combination of Examples 24 through 25 to optionally include the provider system is configured to transmit the user information and the privacy setting to the receiving user device by transmitting a push notification to the receiving user device, receiving a response from the receiving user device, the response requesting the user information and the privacy setting be sent to the receiving user device, and transmitting the user information and privacy setting to the receiving user device.

Example 27 can include, or can optionally be combined with the subject matter of one or any combination of Examples 24 through 26 to optionally include the push notification being triggered by receipt of the user information and the privacy setting from the transmitting user device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. At least one non-transitory machine-readable storage medium for managing user information comprising a plurality of instructions that in response to being executed on a computing device, cause the computing device to:
   determine at a user device, a relationship level between a user associated with the user device and a remote user associated with a remote user device;
   generate, based on the relationship level, a profile of the user, the profile including information about the user and a privacy setting for the information about the user, the privacy setting to be used to permit or deny access to the user information to a third-party application executing on the remote user device, and the privacy setting including individual privacy settings, one for each aspect of a plurality of aspects of information in the profile of the user, each individual privacy setting controlling whether each corresponding aspect of the plurality of aspects of information is visible to the remote user; and
   transmit the profile of the user to the remote user device, the profile including information about the user that is marked public and private, where information about the user that is marked public is accessible to the third-party application executing on the remote user device, and information that is marked private is stored on the remote user device but is not accessible to the third-party application executing on the remote user device.

2. The at least one non-transitory machine-readable storage medium of claim 1, wherein the relationship level comprises a numerical representation in a numerical range.

3. The at least one non-transitory machine-readable storage medium of claim 2, wherein the numerical range is 1 to 10, with lower numbers representing a stronger relationship level and higher numbers representing a weaker relationship level.

4. The at least one non-transitory machine-readable storage medium of claim 1, wherein the profile is stored in a data store at the user device.

5. The at least one non-transitory machine-readable storage medium of claim 1, further comprising instructions to:
   recurrently connect to the remote user device to transmit updated information in the profile.

6. The at least one non-transitory machine-readable storage medium of claim 1, wherein the plurality of aspects of information in the profile of the user includes at least two of: a personal life of the user, a private life the user, a professional life the user, or health characteristics the user.

7. At least one non-transitory machine-readable storage medium for managing user information comprising a plurality of instructions that in response to being executed on a computing device, cause the computing device to:
   receive at a user device from a source device, user information and a privacy setting for the user information, the user information related to that of a remote user, the privacy setting used to permit or deny access to the user information to a third-party application executing on the user device, the user information and privacy setting are organized into an information profile reflecting an aspect of the remote user, the information profile generated based on a relationship level between the remote user and a user associated with the user device, and the privacy setting including individual privacy settings, one for each aspect of a plurality of aspects of information of the remote user, and the information profile including information about the remote user that is marked public and private, where information about the remote user that is marked public is accessible to the third-party application executing on the user device, and information that is marked private is stored on the user device but is not accessible to the third-party application executing on the user device;

store the user information and privacy setting at the user device;

check the privacy setting for the user information; and manage a request to access the user information from the third-party application based on the privacy setting.

8. The at least one non-transitory machine-readable storage medium of claim 7, further comprising instructions to:
attempt to install the third-party application on the user device;
check the privacy setting for the user information; and
allow or deny the third-party application to install based on the privacy setting.

9. The at least one non-transitory machine-readable storage medium of claim 7, further comprising instructions to:
execute the third-party application on the user device;
check the privacy setting for the user information; and
allow or deny access to the user information for the third-party application based on the privacy setting.

10. The at least one non-transitory machine-readable storage medium of claim 7, wherein the instructions to receive user information and the privacy setting further comprise instructions to:
recurrently connect to the source device to determine whether user information is available to download; and
download the user information and the privacy setting.

11. The at least one non-transitory machine-readable storage medium of claim 7, wherein the relationship level comprises a numerical representation in a numerical range.

12. The at least one non-transitory machine-readable storage medium of claim 11, wherein the numerical range is 1 to 10, with lower numbers representing a stronger relationship level and higher numbers representing a weaker relationship level.

13. The at least one non-transitory machine-readable storage medium of claim 7, wherein the profile is stored in a data store at the user device.

14. The at least one non-transitory machine-readable storage medium of claim 7, wherein the plurality of aspects of information of the user includes at least two of: a personal life of the user, a private life the user, a professional life the user, or health characteristics the user.

15. A system for managing user information, the system comprising:
a processor; and
a memory including a plurality of instructions that in response to being executed on the processor, cause the processor to:
determine at a user device, a relationship level between a user associated with the user device and a remote user associated with a remote user device;
generate, based on the relationship level, a profile of the user, the profile including information about the user and a privacy setting for the information about the user, the privacy setting to be used to permit or deny access to the user information to a third-party application executing on the remote user device, and the privacy setting including individual privacy settings, one for each aspect of a plurality of aspects of information in the profile of the user, each individual privacy setting controlling whether each corresponding aspect of the plurality of aspects of information is visible to the remote user; and
transmit the profile of the user to the remote user device, the profile including information about the user that is marked public and private, where information about the user that is marked public is accessible to the third-party application executing on the remote user device, and information that is marked private is stored on the remote user device but is not accessible to the third-party application executing on the remote user device.

16. The system of claim 15, wherein the relationship level comprises a numerical representation in a numerical range.

17. The system of claim 16, wherein the numerical range is 1 to 10, with lower numbers representing a stronger relationship level and higher numbers representing a weaker relationship level.

18. The system of claim 15, wherein the plurality of aspects of information in the profile of the user includes at least two of: a personal life of the user, a private life the user, a professional life the user, or health characteristics the user.

19. A system for managing user information, the system comprising:
a processor; and
a memory including a plurality of instructions that in response to being executed on the processor, cause the processor to:
receive at a user device from a source device, user information and a privacy setting for the user information, the user information related to that of a remote user, the privacy setting used to permit or deny access to the user information to a third-party application executing on the user device, the user information and privacy setting are organized into an information profile reflecting an aspect of the remote user, the information profile generated based on a relationship level between the remote user and a user associated with the user device, and the privacy setting including individual privacy settings, one for each aspect of a plurality of aspects of information of the remote user, and the information profile including information about the remote user that is marked public and private, where information about the remote user that is marked public is accessible to the third-party application executing on the user device, and information that is marked private is stored on the user device but is not accessible to the third-party application executing on the user device;
store the user information and privacy setting at the user device;
check the privacy setting for the user information; and
manage a request to access the user information from the third-party application based on the privacy setting.

20. The system of claim 19, wherein the relationship level comprises a numerical representation in a numerical range.

* * * * *

UNITED STATES PATENT AND TRADEMARK OFFICE
CERTIFICATE OF CORRECTION

Page 1 of 1

PATENT NO. : 9,922,205 B2
APPLICATION NO. : 14/810083
DATED : March 20, 2018
INVENTOR(S) : Prakash et al.

It is certified that error appears in the above-identified patent and that said Letters Patent is hereby corrected as shown below:

In Column 14, Line 51, In Claim 6, after "life", insert --of--

In Column 14, Line 52, In Claim 6, after "life", insert --of--

In Column 14, Line 52, In Claim 6, after "characteristics", insert --of--

In Column 15, Line 49, In Claim 14, after "life", insert --of--

In Column 15, Line 49, In Claim 14, after "life", insert --of--

In Column 15, Line 50, In Claim 14, after "characteristics", insert --of--

In Column 16, Line 26, In Claim 18, after "life", insert --of--

In Column 16, Line 27, In Claim 18, after "life", insert --of--

In Column 16, Line 27, In Claim 18, after "characteristics", insert --of--

Signed and Sealed this
Second Day of June, 2020

Andrei Iancu
*Director of the United States Patent and Trademark Office*